(12) United States Patent
Watson

(10) Patent No.: US 6,527,010 B1
(45) Date of Patent: Mar. 4, 2003

(54) SINGLE PILOT DUAL PULSE SPOOL VALVE

(75) Inventor: Richard R. Watson, Missouri City, TX (US)

(73) Assignee: Gilmore Valve Co., Houston, TX (US)

( * ) Notice: Subject to any disclaimer, the term of this patent is extended or adjusted under 35 U.S.C. 154(b) by 38 days.

(21) Appl. No.: 09/948,846

(22) Filed: Sep. 7, 2001

(51) Int. Cl.⁷ ............................................. F15B 13/043

(52) U.S. Cl. ........................... 137/625.63; 137/625.64; 91/426

(58) Field of Search ...................... 91/426; 137/625.63, 137/625.64, 625.66

(56) References Cited

U.S. PATENT DOCUMENTS 5,901,749 A    5/1999  Watson
6,209,565 B1 *  4/2001  Hughes et al. .............. 137/107

* cited by examiner

Primary Examiner—Gerald A. Michalsky

(57) ABSTRACT

A spool valve may be used in a subsea system with a single upstream pilot valve to control the spool valve. The spool valve opens and closes a main valve in response to fluid signals from the pilot valve. The main valve is connected to a source of pressurized supply fluid, which is selectively directed to a downstream apparatus. The spool valve and the main valve can be produced in an integrated design with a single body. In an alternative embodiment, the spool valve and main valve are separate with separate bodies. The spool valve may also be used in non-subsea systems.

8 Claims, 11 Drawing Sheets

SINGLE PILOT DUAL PULSE SPOOL VALVE

BACKGROUND OF THE INVENTION

1. Field of the Invention.

A single pilot valve directs pressurized pilot fluid to a downstream spool valve. The spool valve directs the pilot fluid to control a main valve. A pressurized source of supply fluid is connected to the main valve and is selectively directed by the main valve to a downstream apparatus such as a cylinder.

2. Description of Related Art

The present invention, a spool valve, is used in combination with a single pilot valve and a main valve, which selectively directs pressurized supply fluid to a downstream apparatus. This system, the single upstream pilot valve, the spool valve, the main valve and the downstream apparatus are typically located subsea, often at great depths, and are commonly used in the production of oil and natural gas. The present invention, a spool valve, is a normally open two position four way valve. The single upstream pilot valve is typically a solenoid operated normally closed two-way three-position valve. When the pilot valve is closed it isolates the source of pressurized supply fluid and vents downstream pilot fluid, including the pilot fluid in the spool valve to atmosphere.

In the past, spool valves have generally not been used subsea in this type of system. The present invention is an improvement of U.S. Pat. No. 5,901,749 assigned to Gilmore Valve Co., the assignee of the present invention. Prior art subsea systems typically did not include a spool valve. Instead, they utilized two upstream solenoid operated pilot valves to control a main valve, which selectively directed pressurized supply fluid to a downstream apparatus. In prior art subsea systems, one solenoid operated pilot valve was actuated to open the main valve and the second solenoid operated pilot valve was actuated to close the main valve. These subsea solenoid operated pilot valves were connected to a surface control system by a long umbilical. Long umbilicals have to support their own weigh because they run from the surface to the sea floor. These umbilicals contained at least one conduit for pressurized pilot fluid, at least one conduit for pressurized supply fluid, at least one power conductor for each solenoid and at least one control conductor to each solenoid. When the main valve was "on" it was necessary to keep the solenoid operated pilot valve "on" which required both electric power and pressurized pilot fluid to be fed to the subsea system. As working depths became greater, it became necessary to reduce the weight of the long umbilical.

One solution was to install a computer subsea with the valves. This reduced the weight of the umbilical because the control conductor ran from the computer to each solenoid operated pilot valve rather than to the surface. In this improved umbilical design, a signal conductor ran from the computer to the surface to carry data along with a single power conductor and the pilot fluid conductor. This improved umbilical eliminated the control conductors running from the surface to each solenoid. The signal conductor sent data from the surface to the subsea computer which then switched power on or off to each solenoid valve. Although the weight of the umbilical has been reduced, the solenoid operated pilot valves still had electrical power requirements because they had to remain in the "on" position to keep the main valve open.

The present invention uses only a single upstream pilot valve rather than two. Clearly, the elimination of the second solenoid operated pilot valve and the wiring used to connect it to a subsea computer is an advantage.

The present invention has another advantage over the prior art because this spool valve does not have to remain in the "on" position to keep the mail valve open. In other words, the present spool valve does not require continuous application of pressurized pilot fluid to hold its position. Instead, the present spool valve typically needs to be activated for several seconds. This pulse operation reduces the electrical power requirements to the solenoid operated pilot valve. Reduced power requirements of the pilot means that the power conductor in the umbilical can be reduced in size to lighten the umbilical even further.

The spool valve of the present invention can be produced as an integrated design with the main valve, all in a single body or the spool valve and main valve can be produced separately with two distinct bodies. When the spool valve of the present invention is combined with a latching main valve, one has the capacity of having the main valve turned to the "off" position if the source of pressurized supply fluid should fail. This combination leads to benefits greatly appreciated by system designers attempting to control multiple functions at great subsea depths including lighter, less costly umbilical connections and smaller, lighter, packages.

BRIEF SUMMARY OF THE INVENTION

The spool valve is connected to a single upstream pilot valve and a main valve to open and close the main valve in response to fluid signals from the pilot valve. The pilot valve is connected to a source of pressurized supply fluid, typically at pressures of between 1,000–3,000 psi, which is selectively directed to an open chamber to open the main valve or to a close chamber to close the main valve. The main valve is connected to a source of pressurized supply fluid, which is selectively directed to a downstream apparatus such as a cylinder. The supply fluid is pressurized at about 10,000 psi. The upstream pilot valve, the spool valve and the main valve are all vented to atmosphere. In subsea applications, atmosphere means the surrounding seawater. To be environmentally friendly, the pilot fluid and the supply fluid are typically fresh water. The spool valve and the main valve can be manufactured as an integrated unit having a single body. In an alternative embodiment, the spool valve can be manufactured separate from the main valve, each of which has a separate body.

BRIEF DESCRIPTION OF THE SEVERAL VIEWS OF THE DRAWINGS

In FIG. 4, the spool valve and the main valve are both in the open position.

In FIG. 9, the spool valve is open and the main valve is closed.

DETAILED DESCRIPTION OF THE INVENTION

Figure 1:
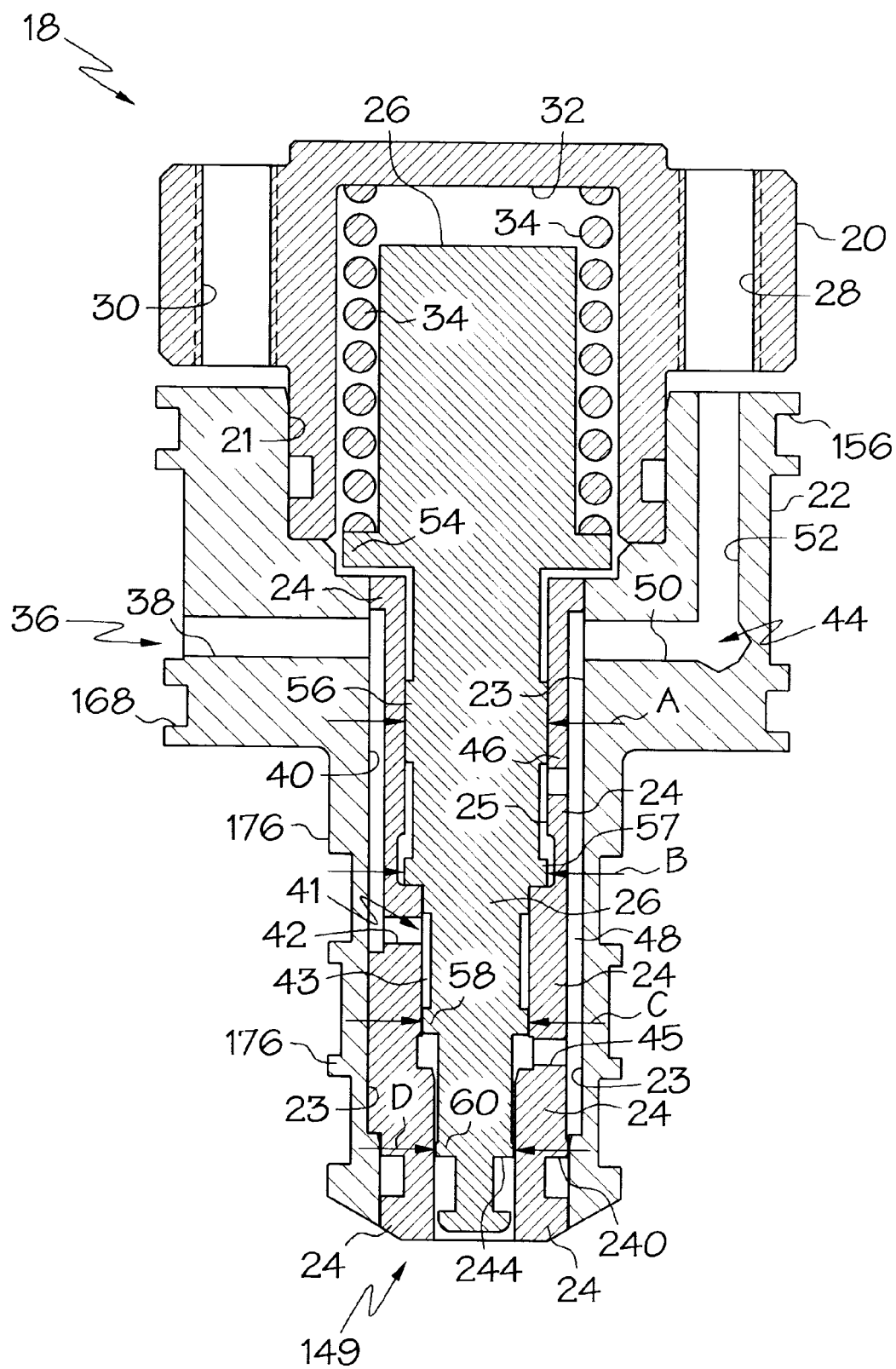
FIG. 1 is a section view of the single pilot dual pulse spool valve.

FIG. 1 is a section view of the single pilot dual pulse spool valve generally identified by the numeral 18. The neck 16 of the spring housing 20 is positioned in a recess 21 in the stationary piston 22. A longitudinal through bore 23 is formed in the stationary piston 22. A sleeve 24 is press fit in the longitudinal bore 23.

A through bore 28 and a through bore 30 are formed in the spring housing 20. A spring chamber 32 is defined by the spring housing 20, the stationary piston 22 and the sleeve 24.

A pilot fluid passageway generally identified by the numeral 36 is defined by the stationary piston 22 and the sleeve 24. The pilot fluid passageway 36 allows pilot fluid to flow from the pilot valve 17 to the spool valve 18. The pilot fluid passageway 36 includes a bore 38 in the stationary piston, a passageway 40 defined by the stationary piston 22 and the sleeve 24 and the spool valve inlet port 42 in the sleeve 24.

Figure 6:
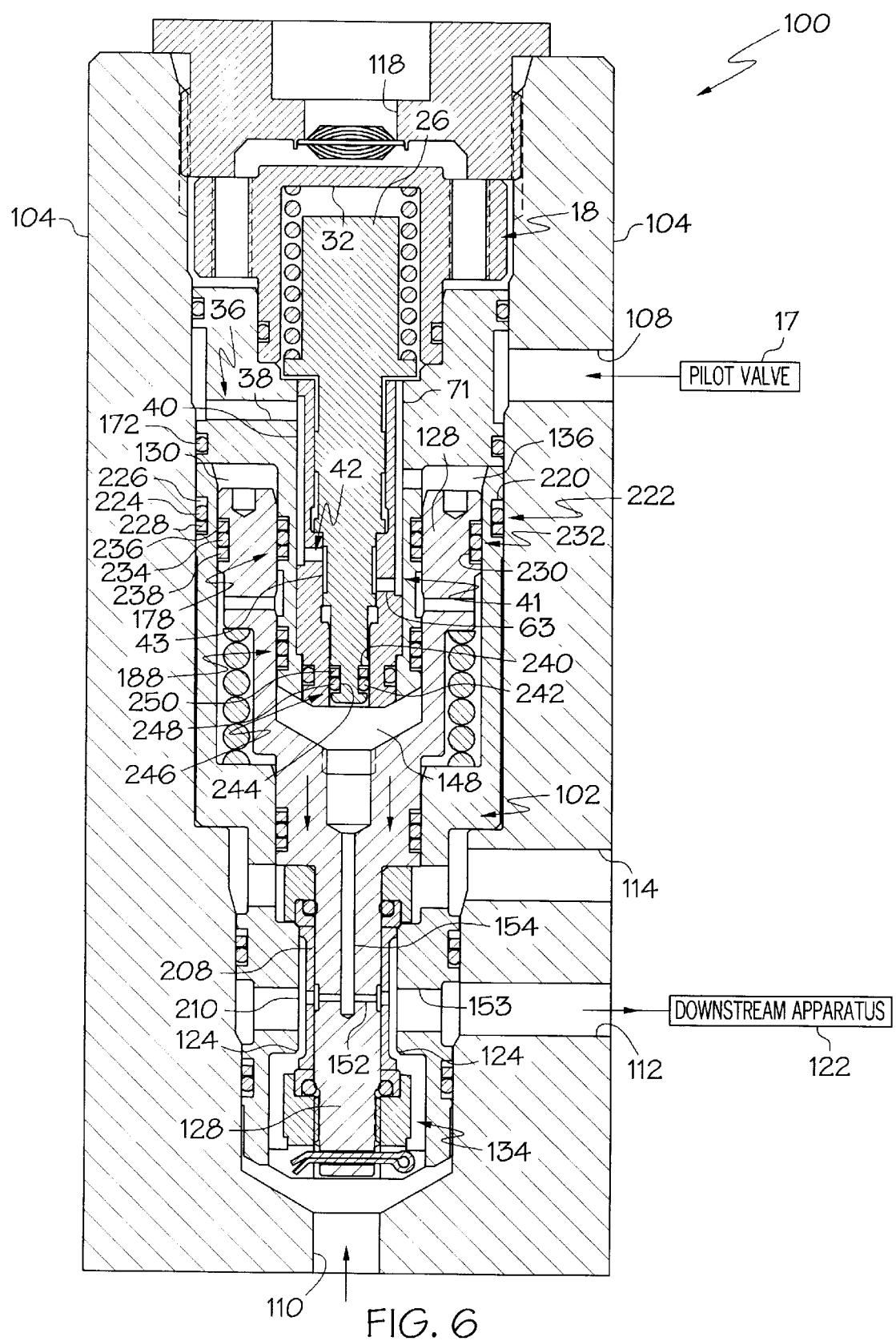
FIG. 6 is a section view of the single pilot dual pulse spool valve and integrated main valve of FIG. 4. However, in FIG. 6, the pilot valve has been actuated and the main valve has moved from the closed to the open position, allowing pressurized supply fluid to flow to the downstream apparatus.

An open passageway is generally identified by the numeral 41 and is better seen in FIG. 6. The open passageway 41 includes an annular passageway 43 between the sleeve 24 and the spool 26, the bore 63 and the passageway 71 better seen in FIG. 6. The open passageway 41 is connected on one end to the spool valve inlet port 42 in the sleeve 24 and the spring chamber 32 and the open chamber 136.

A vent passageway is generally identified by the numeral 44. The vent passageway includes annular passageways 13 and 15, a first bore 45 and a second bore 46 in the sleeve 24, an elongate passageway 48 formed between the sleeve 24 and the stationary piston 22, bores 50 and 52 formed in the stationary piston 22 and through bores 28 and 30 formed in the spring housing 20. The vent passageway 44 is connected on one end to the spool valve inlet port 42 in the sleeve 24 and on the other end to the pilot vent port 18. A close passageway is generally identified by the numeral 63 and is described in detail in connection with the description of FIG. 8.

The elongate movable spool 26 has a shoulder 54 formed about the outer circumference. The shoulder 54 is positioned in the spring chamber 32 and captures the spool valve spring 34 between the shoulder 54 and the spring housing 20. The elongate movable spool 26 includes a first land 56, a second land 57, a third land 58 and a fourth land 60. The diameter of the first land 56 is identified by the arrows A. The diameter of the second land 57 is identified by the arrows B. The diameter of the third land 58 is identified by the arrows C. The diameter of the fourth land 60 is identified by the arrows D.

The diameter of the first land 56 is substantially equal to the diameter of the second land 57. The diameter of the second land 57 is greater than the diameter of the third land 58. The diameter of the third land 58 is greater than the diameter of the four third land 60. The different diameters are used to control movement of the spool 26 from an extended position to a retracted position. The spool is shown in the extended position in FIG. 1 and is shown in the retracted position in FIG. 7. When the spool 26 is extended (FIG. 1) the spool valve 18 is in the open position; when the spool is retracted (FIG. 7) the spool valve 18 is in the closed position. As an example, a spool valve 18 rated for 3,000 psi service could have a first land 56 and a second land 57 with a diameter of 0.335". The third land 58 could have a diameter of 0.25" and the fourth land 60 could have a diameter of 0.188". This example assumes that the spool valve spring 34 has a force of 20 pounds when the spool valve 18 is in the open position and the spool 26 is extended and the force rises to 25 pounds when the spool 26 is in the retracted position. Valves operating at different pressures with different spring forces may use lands with diameters different from these dimensional examples. The exact dimension of the lands will often vary from these examples but the relationship between each land will remain the same, i.e. The first land 56 and the second land 57 will have substantially the same diameters. The diameter of the second land 57 will be larger than the diameter of the third land 58. The third land 58 will have a diameter that is larger than the fourth land 60.

Figure 2:
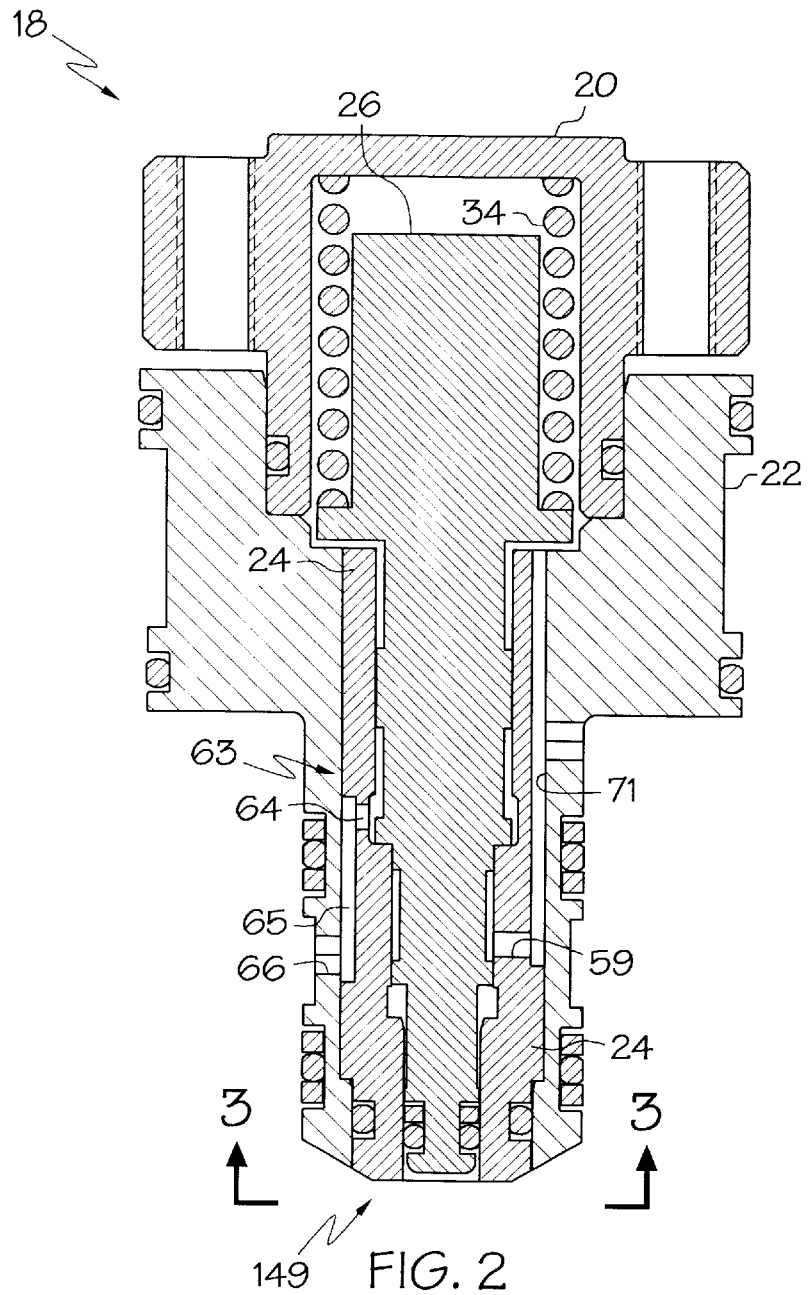
FIG. 2 is a section view of the single pilot dual pulse spool valve of FIG. 1 except the valve has been not rotated ninety degrees.

FIG. 2 is a section view of the single pilot dual pulse spool valve 18 of FIG. 1 except it has been rotated 90° to show passageways that are not seen in FIG. 1. Again, the primary components in the single pilot dual pulse spoon valve 18 are the spring housing 20, the stationary piston 22, the sleeve 24, the spool 26 and the spool valve spring 34.

Figure 8:
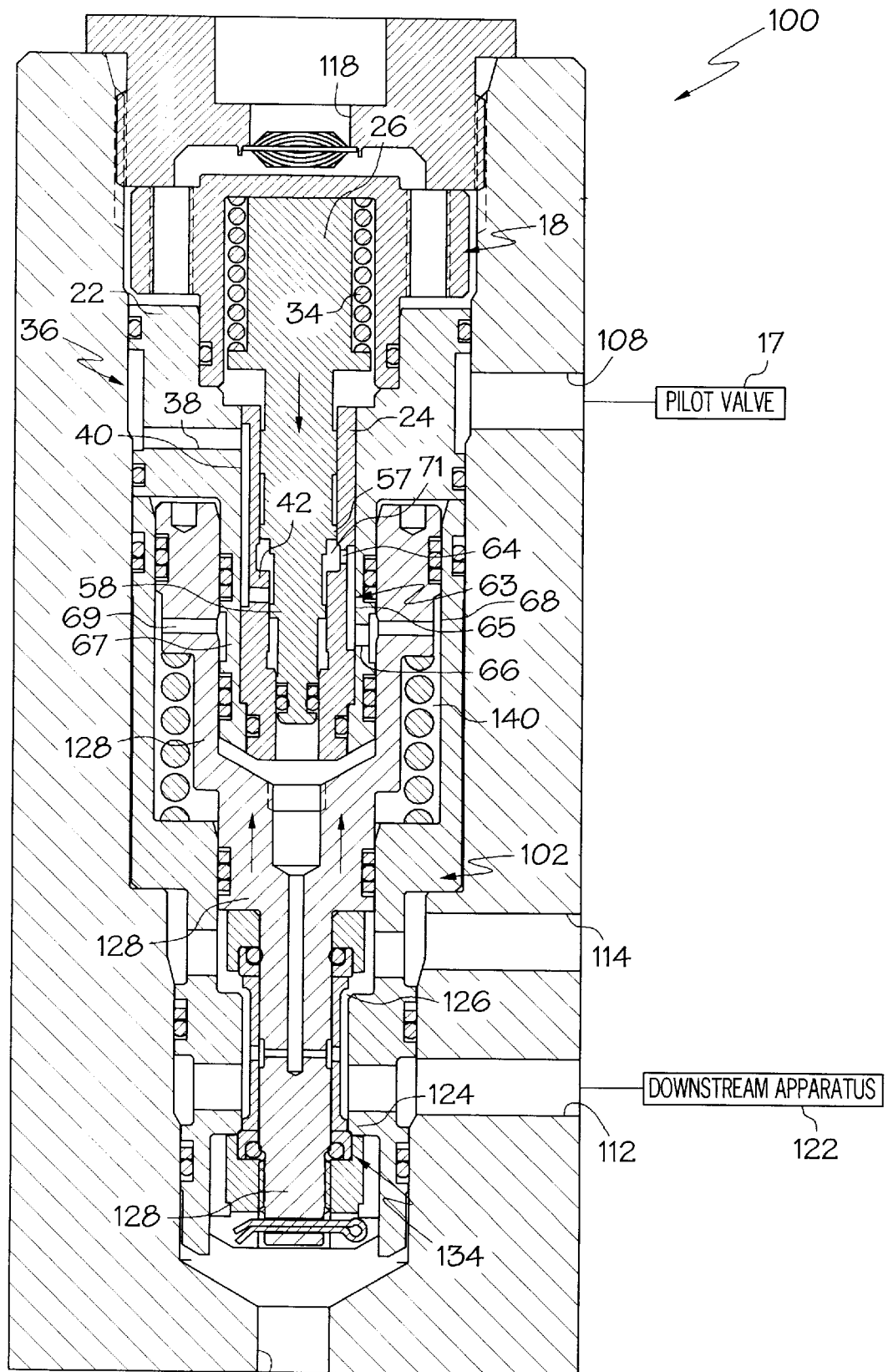
FIG. 8 is a section view of the single pilot dual pulse spool valve and integrated main valve of FIG. 4. However, in FIG. 8, the pilot valve has been actuated a second time to close the main valve. This shuts off pressurized supply fluid from the downstream apparatus. Thereafter the pilot fluid is vented to atmosphere and the spool valve shifts back to the open position of FIG. 5.

A close passageway is generally identified by the numeral 63 and is better seen in FIG. 8. The close passageway includes an annular passageway 71 a bore 64 in the sleeve 24, an annular passageway 65 between the sleeve 24 and the stationary piston 22, a bore 66 in the stationary piston 22, an annular passageway 67 between the stationary piston 22 and the elongate moveable piston 128 and transverse bores 68 and 69 in the piston 128.

The open passageway 41 further includes the bore 59 in the spool 24 and a passageway 71 formed between the sleeve 24 and the stationary piston 22. Pilot fluid is selectively directed from the bore 59 through the passageway 68 to the spring chamber 32 when the pilot valve 17 is actuated and the spool valve 18 is in the open position.

Figure 3:
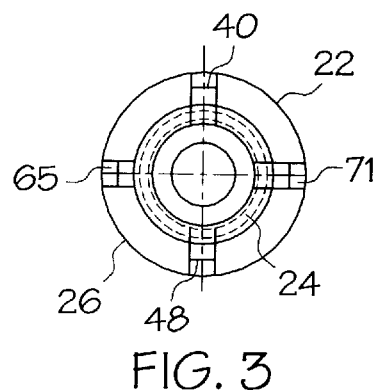
FIG. 3 is a section view of the single pilot dual pulse spool valve along the line 3—3 of FIG. 2.

FIG. 3 is an end view of the single pilot dual pulse spool valve 18 along the line 3–3. The stationary piston 22 is located on the outside and the sleeve 24 is pressed to fit inside the longitudinal through bore 23 of the stationary piston. In the center is the elongate movable spool 26.

At the 12 o'clock position is passageway 40 (best seen in FIG. 1) which is a part of the pilot fluid passageway 36. At the 3 o'clock position is passageway 71 (best seen in FIG. 6) which is a part of the open passageway 41. At the 6 o'clock position is the passageway 48 (best seen in FIG. 1) which is a part of the vent passageway 44. At the 9 o'clock position is the passageway 65 (best seen in FIG. 8) which is a part of the close passageway 63.

Figure 4:
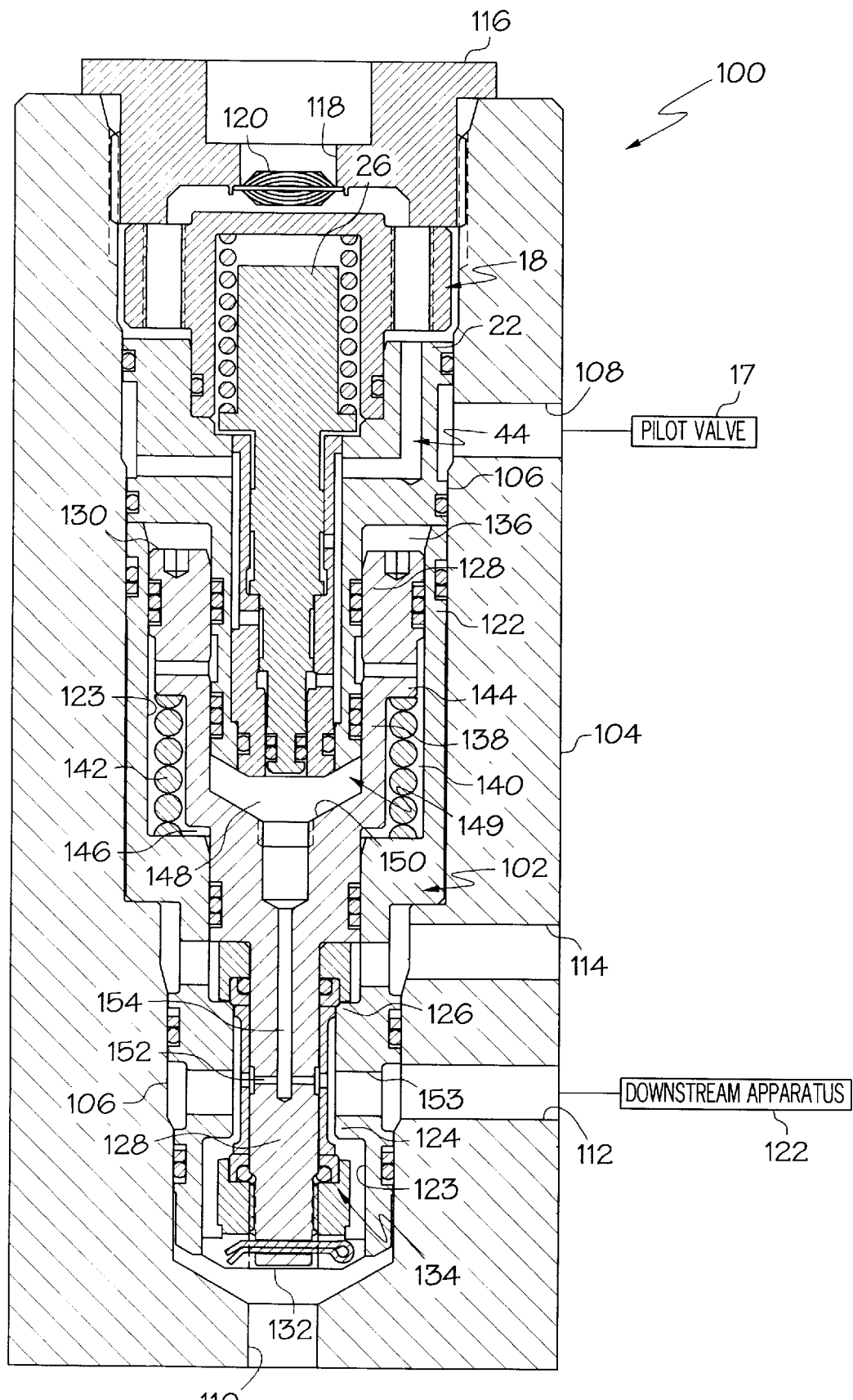
FIG. 4 is a section view of an integrated single pilot dual pulse spool valve and main valve.

FIG. 4 is a section view of the integrated spool valve 18 and main valve 122 generally identified by the numeral 100. The integrated valve 100 has a common body 104 for both the spool valve 18 and the main valve 122. The main valve 122 incorporates a latching design described below. The body 104 defines a valve chamber 106, a supply port 110, a function port 112 and a main vent port 114. A plug 116 threadably engages the valve chamber 106. A pilot vent port 118 is formed in the center of the plug 116. A strainer 120 is positioned in the pilot vent port 118. Pilot fluid can freely pass through the strainer 120.

The upstream pilot valve 17 is connected to a source of pilot fluid, now shown, that is typically pressurized to approximately 3,000 psi. In most subsea applications the pilot valve 17 is solenoid actuated. The supply port 110 is connected to a source of supply fluid that is typically pressurized to approximately 10,000 psi. The function port 112 is connected to a downstream apparatus 122 such as a cylinder. The main vent port 114 is connected to atmosphere. The pilot vent port 118 is likewise connected to atmosphere (i.e., surrounding seawater in subsea applications).

The single pilot dual pulse spool valve 18 in FIG. 4 is shown in the open position and the elongate moveable spool 26 is extended. The main valve 102 is likewise shown in the open position.

The main valve 102 includes a valve cage 122 sized and arranged to fit in the valve chamber 106 of the body 104. A through bore 123 is formed in the valve cage 122. A first valve seat 124 is formed in the bore 123 of the valve cage 122 between the supply port 110 and the function port 112. A second valve seat 126 is formed in the bore 123 of the valve cage 122 between the function port 112 and the vent port 114.

A moveable elongate piston 128 has a head 130 on one end and a toe 132 on the other end. The moveable elongate piston 128 carries a seal assembly generally identified by the numeral 134. In FIG. 4, the seal assembly 134 is engaged with the second valve seat 126 blocking the vent. The seal assembly 134 is disengaged from the first valve seat 124.

An open chamber 136 is defined by the stationary piston 22, the head 130 of the elongate moveable piston 128 and the valve cage 122. A close chamber 140 is defined by the interior bore 123 of the valve cage 122 and the elongate moveable piston 128. A main spring 142 is positioned in the close chamber 140 and is captured between a shoulder 144 formed on the moveable spool 128 and a shoulder 146 formed by the valve cage 122. A latching chamber 148 is defined by the nose 149 of the single pilot dual pulse spool valve 26 and an interior bore 150 in the moveable elongate piston 128.

A transverse bore 152 is formed near the toe 132 of the elongate piston 128. The transverse bore 152 communicates with a longitudinal bore 154, which is in fluid communication with the latching chamber 148. Pressurized supply fluid passes through the bore 152 and the bore 154 when the main valve 102 is in the open position.

Figure 5:
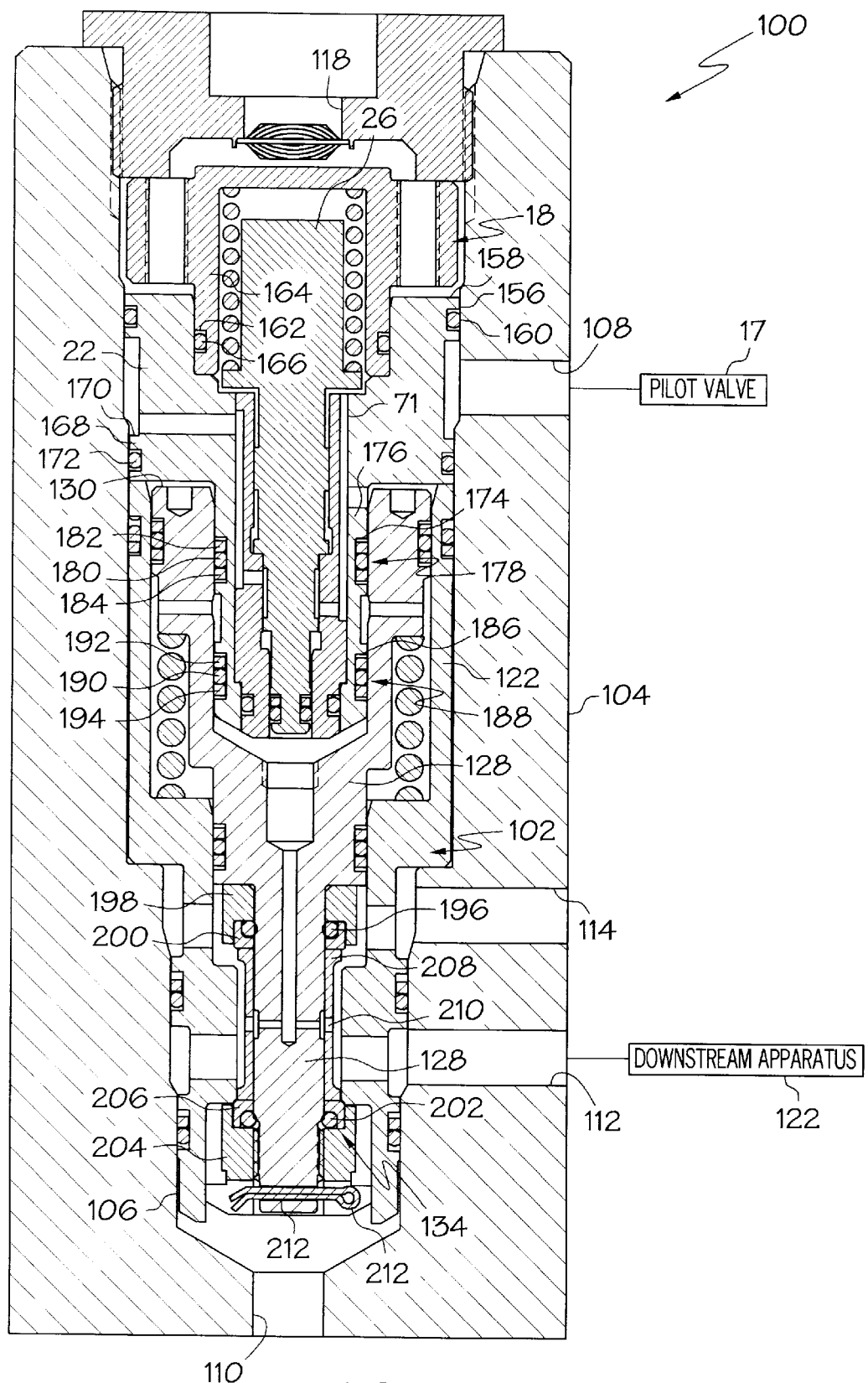
FIG. 5 is a section view of the integrated single pilot dual pulse spool valve and main valve of FIG. 4. However, in FIG. 5, the spool valve is open and the main valve is closed.

FIG. 5 is a section view of the integrated spool valve and main valve 100 of FIG. 4. The spool valve 18 is shown in the open position and the spool 24 is extended. However, main valve 102 is in the closed position isolating the pressurized supply fluid in the supply port 110. The function port 112 and the downstream apparatus 122 are vented to atmosphere through the vent port 114.

An o-ring groove 156 is formed in the first rim 158 of the stationary piston 22. The o-ring groove 156 is sized to receive the o-ring 160. The o-ring 160 achieves a seal between the first rim 158 of the stationary piston and the valve chamber 106 of the body 104.

An o-ring groove 168 is formed in the second rim 170 of the stationary piston 22. The o-ring groove 168 is sized and arranged to receive the o-ring 172 which achieves a seal between the second rim 170 and the valve chamber 106 of the body 104. O-rings 160 and 172 isolate the pilot inlet port 108 and the pilot fluid passageway 36 from other parts of the integrated valve 100.

A seal groove 174 is formed in the neck 176 of the stationary piston 22. A seal assembly generally identified by the numeral 178 is positioned in the seal groove 174. The seal assembly 178 includes an o-ring 180 flanked by a first back up ring 182 and a second back-up ring 184. A seal groove 186 is formed in the neck 176 proximate the nose 149. Seal assembly 188 is positioned in the seal groove 186. The seal assembly 188 includes an o-ring 190 flanked by a first back up ring 192 and a second back-up ring 194. Seal assembly 178 and 188 seal the neck 176 of the stationary piston 22 to elongate moveable piston 128.

The seal assembly generally identified by the numeral 134 includes a first o-ring 196 captured between a first seal gland 198 and a PEEK seal 200. The seal assembly 134 also includes a second o-ring 202 captured between a second gland nut 204 and a PEEK seal 206. The gland nut 204 threadably engages the piston 128. PEEK seals 200 and 206 are separated from one another by a sleeve 208, which has a through bore 210. The seal assembly 134 is held in position on the elongate moveable piston 128 by the second gland nut 204 into which is positioned a cotter pin 212 which secures gland nut 70 against inadvertent rotation relative to the piston 128.

FIG. 6 is a section view of the integrated spool valve and main valve 100 of FIG. 4. The spool valve 18 is shown in the open position and the main valve 102 is likewise shown in the open position.

A seal channel 220 is formed in the outer circumference of the valve cage 106 and is sized and arranged to receive a seal assembly generally identified by the numeral 222. The seal assembly 222 includes an o-ring 224 flanked by a first back up ring 226 and a second back-up ring 228. The seal assembly 222 seals the valve cage 106 to the body 104.

A seal channel 230 is formed in the outer circumference of the elongate moveable piston 128 and is sized and arranged to receive the seal assembly generally identified by the numeral 232. The seal assembly 232 includes an o-ring 234 flanked by a first back up ring 236 and a second back-up ring 238. The seal assembly 232 forms a seal between the elongate moveable piston 128 and the valve cage 122. The open chamber 136 is sealed against other components of the valve 100 by the o-ring 172, and the seal assemblies 222, 232 and 178.

An o-ring groove 240 is formed in the outer circumference of the sleeve 24 proximate the nose 149 of the spool valve 18, and is sized and arranged to receive the o-ring 242. This o-ring achieves a seal between the sleeve 24 and the stationary piston 22. A seal groove 244 is formed on one end of the spool 26 and is sized and arranged to receive a seal assembly generally identified by the numeral 246. The seal assembly 246 includes an o-ring 248 and a back-up ring 250. The o-rings 240 and 250 together with the seal assembly 188 seal the nose 149 of the spool valve 18 against the latching chamber 148.

In FIG. 6, the pilot valve 17 has been actuated causing pressurized pilot fluid to flow through a pilot inlet port 108 and the pilot fluid passageway 36. Typically, it is only necessary to actuate or "pulse" the pilot valve 17 for two or three seconds to open the main valve 102. When the pilot is pulsed, pressurized pilot fluid enters the open chamber 136 and the spring chamber 32. When the pressurized pilot fluid enters the open chamber 136 it acts on the head 130 of the elongate moveable piston 128 driving it down towards the supply port 110 and causing the main spring 142 to compress, thus disengaging the seal assembly 134 from the first valve seat 124.

As shown in FIG. 6, pressurized supply fluid flows from the supply port 110 past the valve seat 124 through the bore 153 to the function port 112 and the downstream apparatus 122. In addition, the pressurized supply fluid flows into the latching chamber 148 to latch the main valve 102 open. Specifically, pressurized supply fluid reaches the latching chamber 148 as it flows from the supply port 110 past the first valve seat 124 through the bore 210 in the sleeve 208, through the transverse bore 152 and the longitudinal passageway 154 to the latching chamber 148.

When the pilot valve 17 is first actuated as shown in FIG. 6, pressurized pilot fluid flows through the pilot inlet port 108, the pilot fluid passageway 36, the open passageway 41 to the open chamber 136 causing the main valve 102 to open and allowing pressurized supply fluid to flow from the supply port 110 through the function port 112 to the downstream apparatus 122. In addition, pressurized pilot fluid also flows to the spring chamber 32 through the bore 63 and the passageway 71. The pressurized supply fluid in the spring chamber 32 keeps the moveable spool 26 in the extended position. The pressurized supply fluid is in contact with the first land 56 of the spool 26. It is important that the diameter of the first land 56 be greater than the diameter of the fourth land 60 in order to keep the spool in the extended open position while the main valve is open. While pilot fluid is acting on the first land 56 forcing the spool 26 to the extended position, supply fluid is acting on the fourth land 60 in the opposite direction. Because the first land 56 has an area that is larger than the fourth land 60, the spools stay in the extended position.

Figure 7:
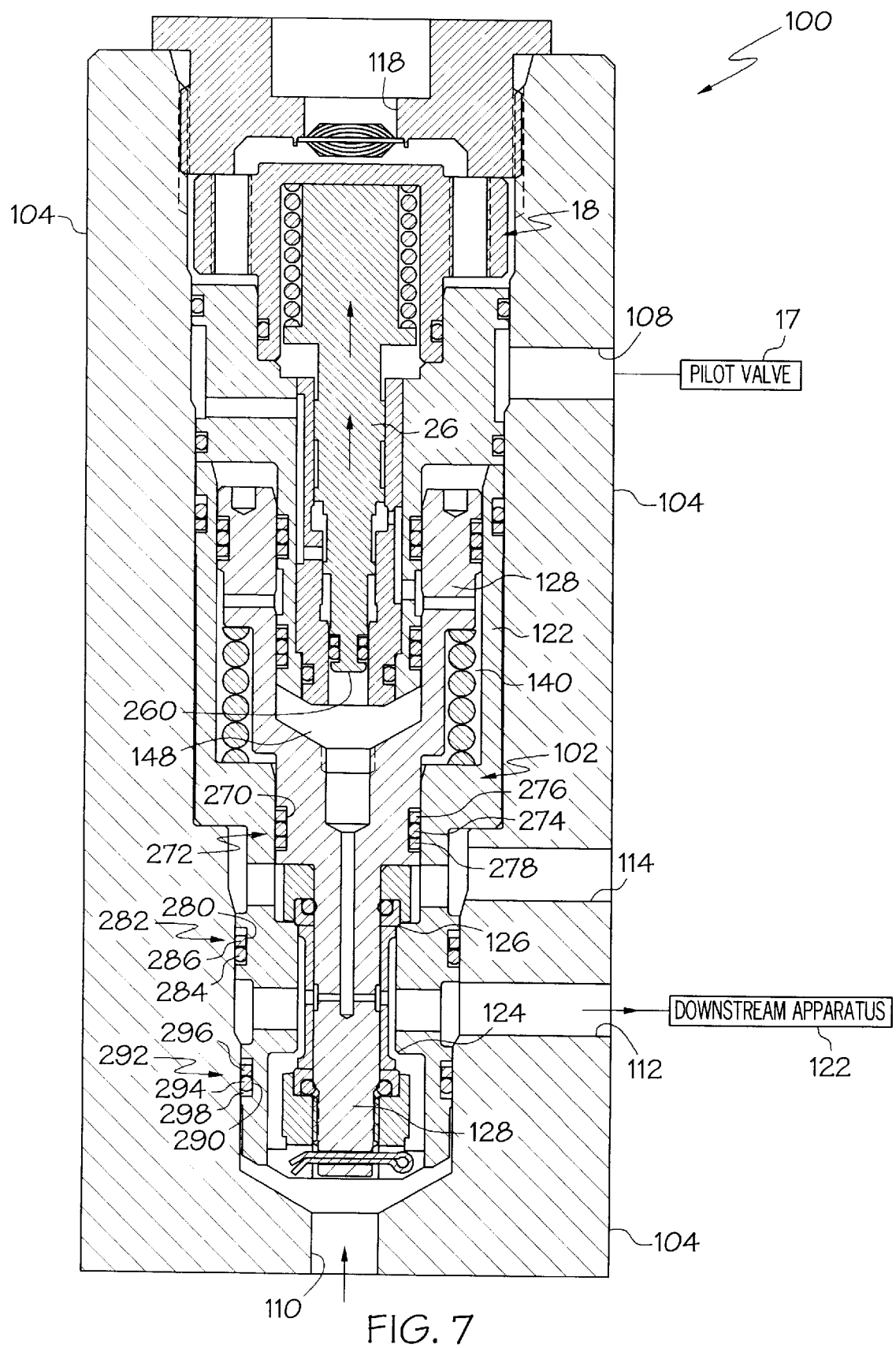
FIG. 7 is a section view of the single pilot dual pulse spool valve and integrated main valve of FIG. 4. However, in FIG. 7, the pilot fluid has been vented to atmosphere and the spool valve has shifted to the closed position. The main valve is latched open and pressurized supply fluid continues to flow to the downstream apparatus.

FIG. 7 is a section view of the integrated spool valve and main valve 100 of FIG. 4. However, in FIG. 7 the pilot valve 17 is has been turned off. The pilot valve 17 is typically a solenoid operated normally closed two position three way valve. When the pilot valve 17 shifts to the "off" or closed position, it isolates the source of pressurized supply fluid and the pilot valve 17 vents downstream pilot fluid from the valve 17 and the spool valve 18. When the pilot fluid is vented from the spring chamber 32 the spool 26 shifts to the retracted, closed position. The main valve 102 remains latched in the open position and pressurized supply fluid continues to flow from the supply port 110 through the function port 112 to the downstream apparatus 122.

The reason the spool valve 18 shifts from the open position of FIG. 6 to the closed position of FIG. 7 is because pressurized supply fluid in the latching chamber 148 is pressing against seal assembly 246 and the fourth land 60 of the elongate moveable spool 26. The force exerted by the pressurized supply fluid on the seal assembly 246 and the fourth land 60 forces the spool 26 upward towards the pilot vent port 118. The main valve 108 remains latched open when the spool valve 18 shifts to the closed position as shown in FIG. 7 because the pressurized supply fluid in the latching chamber 148 exerts a force on the elongate moveable piston 128 overcoming the opposing forces being exerted by the main spring 142.

A seal channel 270 is formed in the outer circumferences of the elongate moveable piston and is sized and arranged to receive a seal assembly 272. The seal assembly 272 includes an o-ring 274 flanked by a first back-up ring 276 and a second back-up ring 278. The seal assembly 272 achieves a seal between the elongate moveable piston 128 and the valve cage 122. The seal assembly 272 also isolates the close chamber 140 from the vent port 114.

The valve cage 122 has a seal groove 280 formed on the outer circumference, which is sized and arranged to receive a seal assembly 282. The seal assembly 282 includes an o-ring 284 and a back-up ring 286. The seal assembly 282 makes a seal between the valve cage 122 and the body 104. Another seal groove 290 is formed on the outer circumference of the valve cage 122 and is sized and arranged to receive a seal assembly 292. The seam assembly 292 includes an o-ring 294 flanked by two back-up rings 296 and 298.

FIG. 8 is a section view of the integrated spool valve and main valve 100 of FIG. 4. However, in FIG. 8 the spool valve 18 is in the closed position and the spool 26 is retracted. The main valve 102 is in the closed position. Pressurized supply fluid is contained in the supply port 110.

Actuation of the pilot valve 17 a second time causes pilot fluid to flow from the pilot inlet port 108 to the pilot fluid passageway 36, where the retracted spool 26 directs the pilot fluid to the close passageway 63 and the close chamber 140 causing the moveable piston 128 to move upward so the seal assembly 134 engages the first seat 124 as shown in FIG. 8. This closes the main valve 108 and isolates pressurized supply fluid in the supply port 110. The downstream apparatus 122 is open to the main vent port 114 because the seal assembly 134 is disengaged from the second seat 126.

As previously explained, the pilot fluid passageway 36 includes a bore 38 in the stationary piston 22, a passageway 40 between the stationary piston 22 and the sleeve 24 and, the spool valve inlet port 42 through the sleeve 24. This allows pilot fluid to flow from the pilot valve 17 through the pilot inlet port 108 through the pilot fluid passageway 36. The close passageway 63 is connected on one end to the spool valve inlet port 42 in the sleeve and on the other end to the close chamber 140. The close passageway 63 includes an annular passageway 71, a bore 64 through the sleeve 24, a passageway 65 between the sleeve and the stationary piston 22, a bore 66 through the stationary piston 22, the annular passageway 67, and a plurality of bores 68 and 69 through the moveable piston 128. In order for pilot fluid to flow from the pilot valve 17 to the closed chamber 140, it must move through the pilot inlet port 108, the bore 38, the passageway 40, the spool valve inlet port 42, the annular passageway 71, the bore 64, the passageway 65, the bore 66, the annular passageway 67 and the bores 68 and 69.

It is important to note when the pilot valve 17 has been actuated a second time, the pilot fluid exerts a force on the second land 57 causing the spool 26 to remain in the retracted position as shown in FIG. 8. It is important that the diameter of the second land 57 be greater than the diameter of the third land 58 so that the pilot fluid can hold the spool 26 in the retracted position as shown in FIG. 8. After the pilot valve 17 has been pulsed for two or three seconds, the pilot valve 17 is closed and the pilot fluid is vented to atmosphere through the pilot valve 17. The spring 34 then causes the spool to shift to the extended position. The integrated valve 100 then moves back to the position shown in FIG. 4 with the moveable spool 26 in the extended open position and the main valve 102 in the open position.

Operational Sequence

The operational sequence for the integrated spool valve and main valve 100 is described below.

Position 1 is shown in FIG. 5. The pilot valve 17 is closed and no pilot pressure is being applied to the spool valve 18 which is in the open position with the spool 26 extended. The main valve 102 is closed and pressurized supply fluid is isolated in the port 110. The downstream apparatus 122 is vented to atmosphere through main vent port 114.

Position 2 is shown in FIG. 6. The pilot valve 17 is actuated and pressurized pilot fluid flows to the spool valve 18 where it is directed by the spool 26 to the open chamber 136 and the spring chamber 32 through the open passageway 41. When the spool is in the extended open position, as shown in FIG. 6, the close chamber 140 is vented to atmosphere by the vent passageway 44 when the pressurized pilot fluid enters the spool valve 18, it creates a force on the first land 56 urging the spool valve 18 to remain in the open position. It is important to note that land 56 has a greater diameter than land 60 so the forces acting on the spool 18 keep it in the extended position as shown in FIG. 6 while the pilot valve 17 is on. The pressurized pilot fluid in the open chamber 136 also causes the main valve 102 to open allowing pressurized supply fluid to flow from the supply port 110 to the function port 112 and the downstream apparatus 122. The pilot valve 17 must remain open or "on" long enough to fully actuate the downstream apparatus. Typically the spool valve will only need to be "on" several seconds, but depending on the type of downstream apparatus and its proximity to the valve 100, it could take longer. The pilot valve 17 is typically a two position three way valve. When the pilot valve 17 is "on" or open pilot fluid flows from the source of pressurized pilot fluid, not shown in the valve 100. The vent in the pilot valve 17 is not shown. When the pilot valve 17 is "off" or closed, it vents to atmosphere all downstream pilot fluid, including the pilot fluid in the valve 188.

Position 3 is shown in FIG. 7. After the pilot 17 has been closed, the pilot fluid is vented to atmosphere through the pilot valve 17. All downstream pilot fluid, including the pilot fluid in the valve 100 is vented through the pilot valve 17. When the pilot fluid in the spool valve 18 is vented to atmosphere the spool 26 shifts to the retracted closed position as shown in FIG. 7 because of the pressurized supply fluid acting on the fourth land 60. In the retracted closed position, the open chamber 136 is vented to atmosphere through the vent passageway 44 and the pilot vent port 1 18. The main valve 102 remains latched open because of the forces from supply fluid acting on the latching chamber 148. When the main valve 102 is open, as shown in FIG. 7, the supply port 110 is in fluid communication with the function port 112 and the downstream apparatus 122.

Position 4 is shown in FIG. 8. The pilot valve 17 is actuated a second time and pressurized pilot fluid flows to the close chamber 140. The forces acting on the piston 128 in the close chamber 140 cause the main valve 102 to close. Pressurized supply fluid is isolated in the supply port 110 and the downstream apparatus 122 is vented to atmosphere through the main valve vent port 114. Typically it will only be necessary to actuate the pilot valve 17 for a few seconds to fully vent the apparatus 122; however, depending on the type of downstream apparatus and its proximity to the main vent port 114, it could take longer.

When the downstream apparatus 122 is fully vented, the operator will close the pilot valve 17 and all downstream pilot fluid, including the pilot fluid in valve 100, will be vented through pilot valve 17. When the pilot fluid is vented from the spool valve 18, the force of the spring 34 shifts the spool from the retracted to the extended position of Position 1 as shown in FIG. 5. This spool valve 18 makes it possible to use only one upstream solenoid operated pilot valve 17 with intermittent pulses of electrical power to control the output of a large flow high pressure main valve 102. This has not previously been feasible in subsea systems of this type.

The pilot fluid typically used in subsea applications for the spool valve 18 is fresh water, which may be treated with corrosion inhibitors and/or other chemicals. When the pilot fluid is "vented to atmosphere", it is released to the surrounding seawater. Fresh water is often used as pilot fluid because it is ecologically friendly and is not combustible like some other fluids. Seawater at 8,000 feet is at approximately 4000 psi. The exact pressure varies from place to place. The pilot fluid coming from the surface through the umbilical to the subsea pilot valve 17 is likewise at approximately 4000 psi at 8,000 feet.

Figure 9:
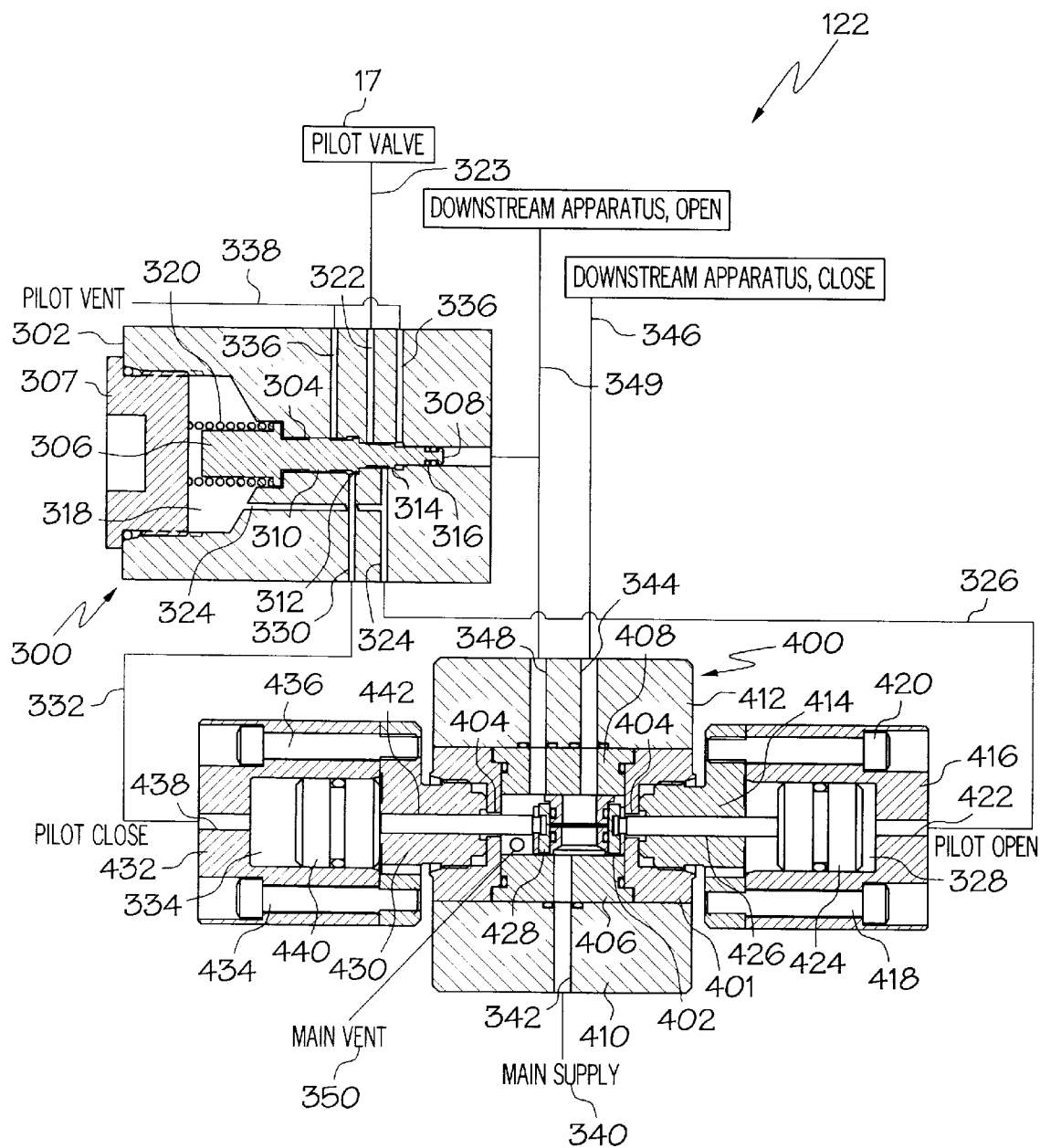
FIG. 9 is a section view of an alternative embodiment of the single pilot dual pulse spool valve that is separate from the main valve.

FIG. 9 is a section view of an alternative embodiment of the single pilot dual pulse spool valve 300 and a separate main valve generally identified by the numeral 400. The main valve 400 does not have a latching feature like main valve 102. A pilot valve 17 is connected to a pressurized source of pilot fluid, not shown. The main valve 400 is connected to a pressurized source of supply fluid 340. The main valve 400 directs pressurized supply fluid to a downstream apparatus generally identified by the numeral 122.

Figure 12:
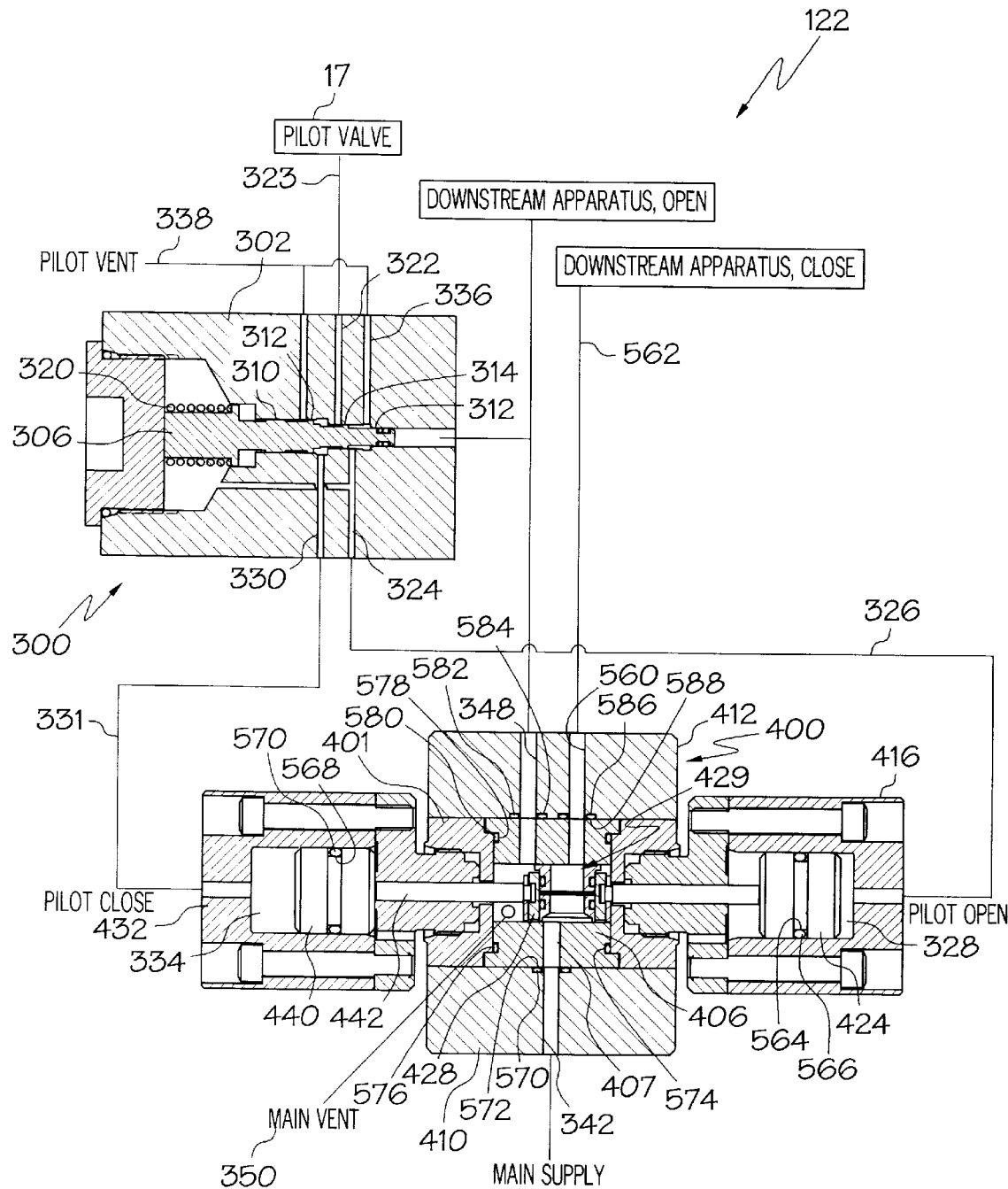
FIG. 12 is a section view of the alternative embodiment of the single pilot dual pulse spool valve of FIG. 9. However, in FIG. 12, the pilot valve has been actuated a second time causing the main valve to close. Pressurized supply fluid is redirected to the downstream apparatus causing it to also close. Thereafter, the pilot fluid is vented to atmosphere and the spool valve shifts back to the open position of FIG. 9.

The single pilot dual pulse spool valve 300 has a body 302 which defines an axial bore 304 that is sized in the range to receive an elongate moveable spool 306. The spool 306 moves from an extended open position, as shown in FIG. 9 to a retracted closed position as shown in FIG. 12. The spool 306 selectively directs the flow of pilot fluid through the spool valve to the main valve 400. A blunt end 308 of the spool 306 is selectively exposed to pressurized supply fluid.

The elongate moveable spool 306 has a first land 310, a second land 312, a third land 314 and a fourth land 316. At least three of the lands are of different diameters to control movement of the spool 306 from the extended position to the retracted position. A spring chamber 318 is in selected fluid communication with pilot fluid. A spring 320 is captured in the spring chamber 318 urging the moveable spool 306 into the extended position.

The spool valve body 302 further defines a pilot fluid passageway 322, which is connected by a conduit 323 to the pilot valve. The pilot fluid passageway 322 allows pilot fluid to flow from the pilot valve 17 in to the spool valve 300. The spool valve body 302 further defines a pilot open passageway 324, which is connected by the conduit 326 to an open chamber 328 in main valve 400. The open passageway 324 also connects to the spring chamber 318. The open passageway 324 allows pilot fluid to selectively flow to the spring chamber 318 and the open chamber 328.

A close passageway 330 is connected by conduit 332 to a close chamber 334 in main valve 400. The close passageway 330 allows pilot fluid to selectively flow from the spool valve 300 to the close chamber 334. A vent passageway 336 is connected by a conduit 338 to atmosphere.

The main valve 400 has a body 401 that defines a central bore 402 and a transverse bore 404. A supply seal plate 406 fits in one end of the central bore 402 and a cylinder seal plate 408 fits in the other end of the bore 402. A supply cover 410 captures the supply seal plate in the body 401 and is secured by four screws (not shown) passing through the body 401 and into receiving threads in a cylinder cover 412 which captures the cylinder seal plate 408 in the body 401.

A pilot open base 414 threadably engages the body 401. A pilot open cylinder cap 416 is bolted to the base 414 by cap screws 418 and 420 and two others, not shown. A pilot open piston 424 slides back and forth in the open chamber 328. The pilot open piston 424 is connected to a pilot open piston rod 426, which connects to a seal carrier 428.

On the opposite side of the main valve 400, a pilot closed base 430 threadably engages the body 401. A pilot closed cylinder cap 432 is bolted to the base 430, which a plurality of cap screws 434 and 436 and two others, not shown. A main valve pilot close port 438 allows pilot fluid to enter the pilot close chamber 434. A pilot close piston 440 slides back and forth in the pilot close chamber 334. A pilot closed piston rod 442 is connected on one end to the pilot close piston 440 and on the other end to the seal carrier 428. The main valve 400 is vented to atmosphere through main valve vent port 350 and main valve vent port 351, better seen in FIG. 10.

Figure 10:
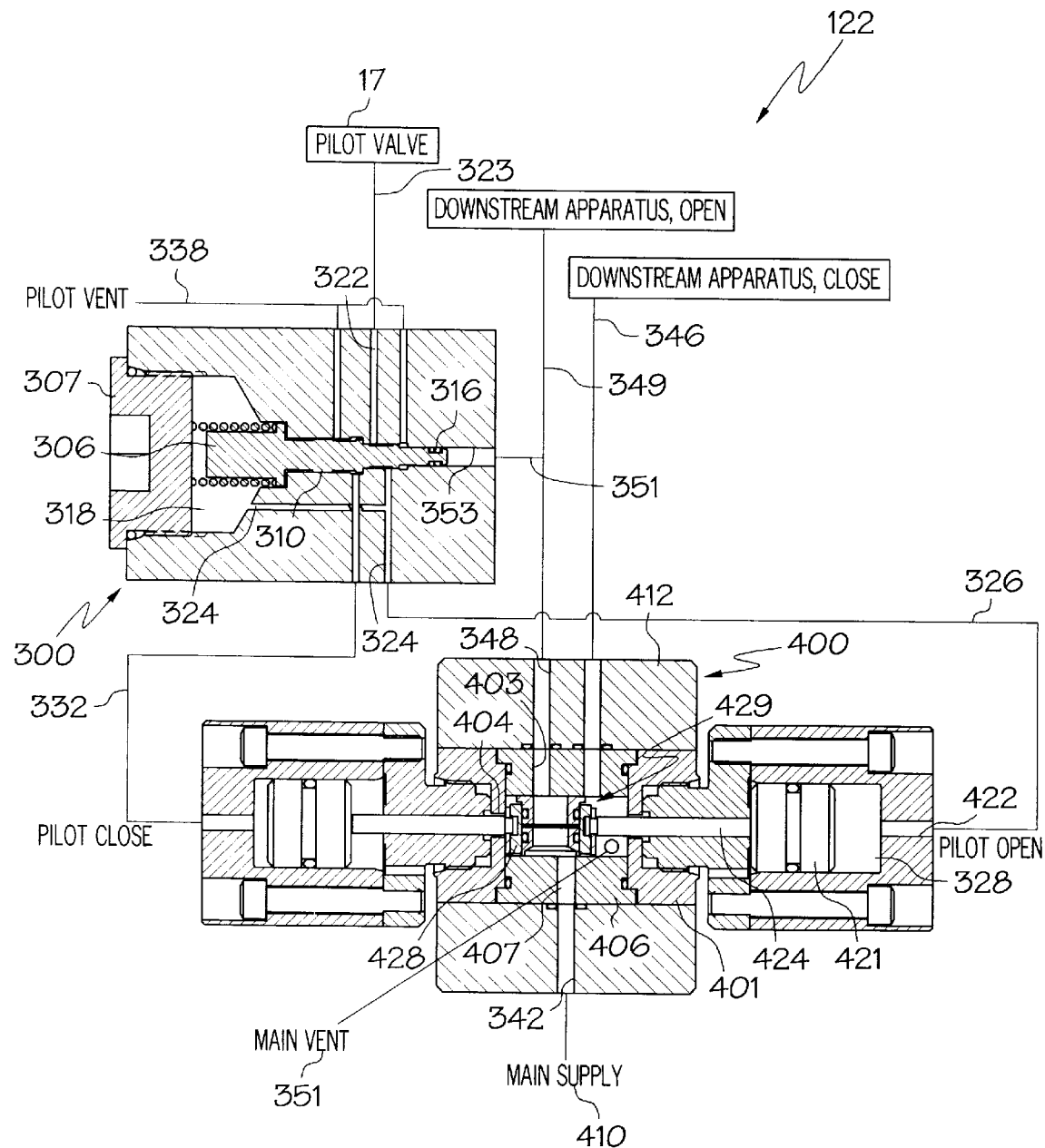
FIG. 10 is a section view of the alternative embodiment of the single pilot dual pulse spool valve of FIG. 9. However, in FIG. 10, the upstream pilot valve has been actuated causing the main valve to open, which allows pressurized supply fluid to flow to the downstream apparatus.

FIG. 10 is a section view of the single pilot dual pulse spool valve 300 and the main valve 400. The spool valve 300 is in the open position and the main valve 400 has also shifted into the open position.

When the pilot valve 17 is actuated (typically pulsed for two or three seconds) pilot fluid flows from the source of pressurized pilot fluid through the pilot valve 17, the conduit 332, and the pilot fluid passageway 322 into the spool valve 300. Pilot fluid is then directed by the spool 306 into the pilot open passageway 324 into the spring chamber 318. Pilot fluid also flows from the pilot open passageway 324 through the conduit 326 and the inlet port 422 into the pilot open chamber 328 of the main valve 400. The presence of pressurized pilot fluid in the open chamber 328 causes the piston 424 to shift to the open position shown in FIG. 10. When the piston 424 moves towards the body 401 it moves the piston rod 424 and the seal carrier 428 shifting the main valve 400 into the open position.

When the main valve 400 is in the open position as shown in FIG. 10, pressurized supply fluid passes through the supply port 342, the through bore 407 in the seal plate 406 and the seal assembly generally identified by the numeral 429. The pressurized supply fluid then passes into the through bore 403 of the seal plate 404 and the open port 348 of the cover 412. The pressurized supply fluid then passes through the conduit 349 to open the downstream apparatus 122.

It is important to note that the diameter of the first land 310 of spool 306 must be greater than the diameter of the fourth land 316 in order to hold the spool 306 in the extended open position as shown in FIG. 10. Pressurized pilot fluid exerts a force on the first land 310 that overcomes the opposing forces that are being exerted on the fourth land 316 by pressurized supply fluid that enters the spool valve 300 through conduit 351 and port 353.

Figure 11:
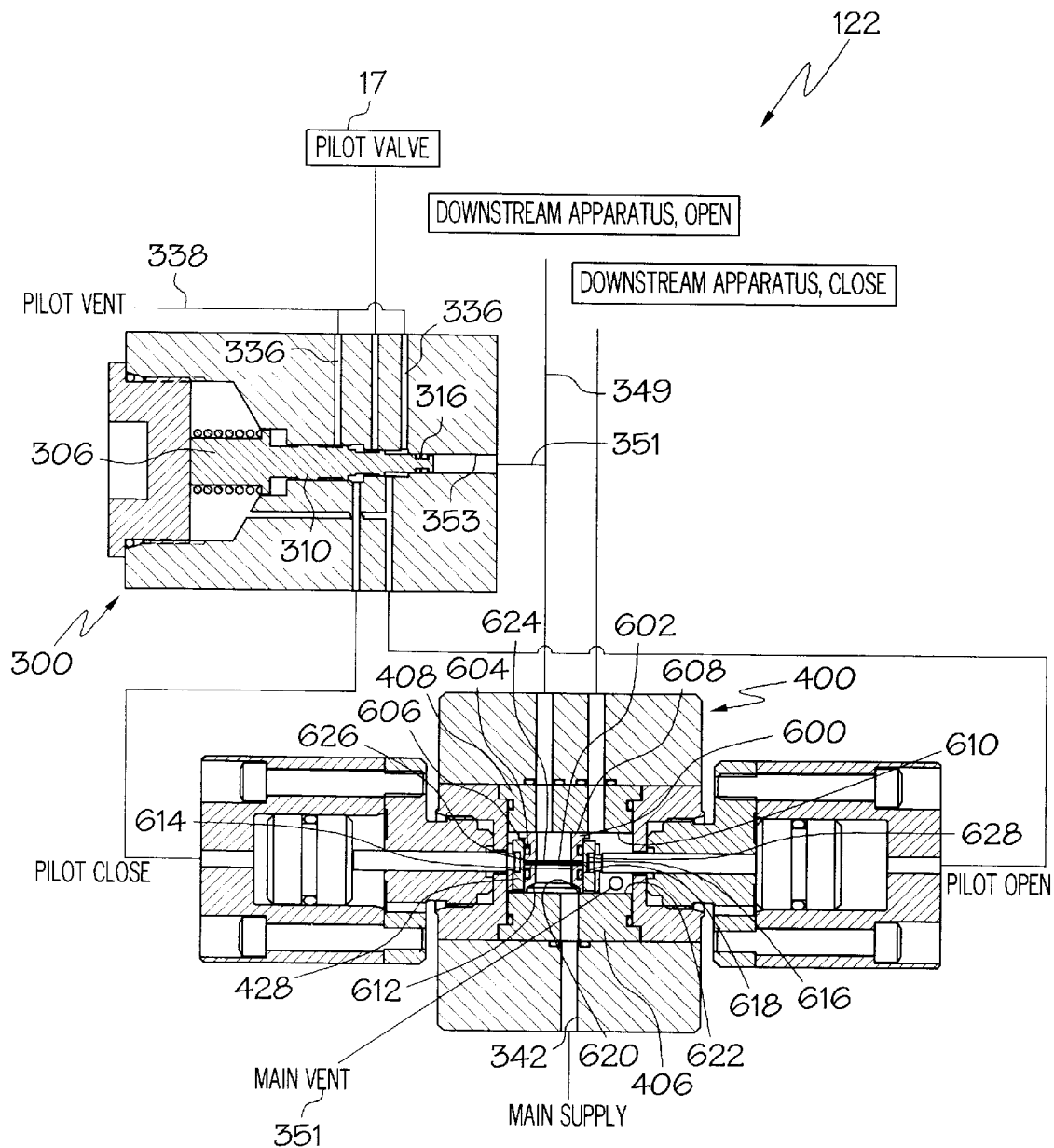
FIG. 11 is a section view of the alternative embodiment of the single pilot dual pulse spool valve of FIG. 9. However, in FIG. 11, the pilot fluid has been vented to atmosphere and the spool valve has shifted to close and the main valve continue to stay open. Pressurized supply fluid continues to flow through the main valve to the downstream apparatus.

FIG. 11 is a section view of the spool valve 300 and the main valve 400. In FIG. 11 the pressurized pilot fluid has been vented through the upstream pilot valve 17 to atmosphere (i.e., ambient seawater in subsea applications).

When the pilot fluid is vented from the spool valve 300, the force of the pilot fluid that was acting on the first land 310 is dissipated and the force of the pressurized supply fluid acting on the fourth land 316 causes the spool 306 to shift from the extended to the retracted position as shown in FIG. 11. This shift of position closes the spool valve 300 and it remains in the closed position because of the forces exerted on the spool 306 by the pressurized supply fluid acting on the fourth land 316. Likewise, the main valve 400 stays in the open position as shown in FIG. 11 until the pilot valve is actuated a second time.

The seal assembly 429 includes a cylinder seal ring 600 and a supply seal ring 612. The cylinder seal ring 600 makes a metal to metal seal with the cylinder seal plate 610 and the supply seal ring 612 makes a metal to metal seal with the supply seal plate 622.

The cylinder seal ring 600 has a through bore 602 through which pressurized supply fluid passes. The cylinder seal ring 600 has an o-ring groove 604 sized and arranged to receive the o-ring 606. O-ring 606 forms a seal between the cylinder seal ring 600 and the seal carrier 428. A flat surface 608 is formed on one end of the cylinder seal ring 600. The flat surface 608 slides across the flat surface 610 of the cylinder seal plate 408. The flat surface 608 on the cylinder seal ring 600 and the flat surface 6710 on the cylinder seal plate 408 are lapped to a flat finish to facilitate a metal to metal seal.

Supply seal ring 612 has a bore 614 that allows pressurized supply fluid to pass through the supply seal ring 612. An o-ring groove 616 is formed in the supply seal ring and is sized and arranged to receive the o-ring 618. The o-ring 618 achieves a seal between the supply seal ring 612 and the seal carrier 428.

A flat surface 620 is formed on one end of the supply seal ring 612 and is positioned to slide across the flat surface 622 on the supply seal plate 406. The flat surface 620 and the flat surface 622 are lapped to a flat finish to achieve a tight metal to metal seal. In between the cylinder seal ring 600 and the supply seal ring 612 is a curved spring washer 624 that urges the cylinder seal ring 600 and the supply seal ring 612 into contact with their respective seal plates. However, the tight metal to metal seal is not achieved by the curved spring washer 624. Instead, the tight metal to metal seal is achieved by the force of the pressurized supply fluid acting on the rear surface 626 of the cylinder seal ring 600 and the rear surface 628 of the supply seal ring 612.

FIG. 12 is a section view of the spool valve 300 and the main valve 400. Actuation of the pilot valve 17 a second time causes pilot fluid to flow through the conduit 323, the pilot fluid passageway 322 of the spool valve 300 to the close passageway through conduit 331 to the close chamber 334. As the pilot fluid fills the closed chamber 334, the main valve 400 moves from the open to the closed position as shown in FIG. 12. The close piston 440 moves towards the body 401 causing the piston rod 442 to move the seal carrier 428 from the open position to the closed position as shown in FIG. 12.

When the main valve 400 is in the closed position, pressurized supply fluid moves through the port 342, the passageway 407, the bore 560 and the cover 412, the conduit 562 to close the downstream apparatus 122. When the pressurized pilot fluid is flowing from the pilot valve 17 through the spool valve 300 to the close chamber 334, the open chamber 328 is vented to atmosphere allowing pilot fluid in the open chamber 328 to escape from the main valve 400. The open chamber 328 is vented to atmosphere through the conduit 326, the open passageway 324, the vent passageway 336 and the conduit 338.

The open piston 424 has an o-ring groove formed in the outer circumference that is sized and arranged to receive the o-ring 566. The o-ring 566 achieves a seal between the open piston 424 and the pilot open cylinder cap 416.

Likewise, the pilot close piston 440 has a groove 568 formed in the outer circumference that is sized and arranged to receive the o-ring 570. The o-ring 570 achieves a seal between the pilot close piston 440 and the pilot close cylinder cap 432.

As previously discussed, the pilot closed piston 440 has a groove 568 formed in the outer circumference that is sized and arranged to receive the o-ring 570. The o-ring 570 achieves a seal between the pilot close piston 440 and the pilot close cylinder cap 432.

As previously discussed, the first land 310 has the same diameter as the second land 312. It is important to note that the second land 312 has a diameter that is greater than the third land 314. The third land 314 has a diameter that is greater than the fourth land 312. When the pilot valve 300 is in the position shown in FIG. 12, the pressurized pilot fluid acts on the second land 312 and the third land 314. However, because the second land 312 has a larger diameter than the third land 314, the pressurized pilot fluid holds the spool 306 in the retracted position as shown in FIG. 12.

When the pilot valve 17 is closed, the downstream pilot fluid is vented to atmosphere through the pilot valve 17. Typically, the pilot valve 17 is a normally closed two position three way valve. When it is "on" or open, pressurized supply fluid flows to the spool valve 18. When it is "off" or closed, it vents downstream pilot fluid. When the forces acting on the second land 312 are dissipated, the force of the spring 320 shift the spool 306 to the extended open position as shown in FIG. 9. The main valve 400 remains in the closed position.

An o-ring groove 570 is formed in the supply cover 410 and is sized and arranged to receive the o-ring 572. The o-ring 572 forms a seal between the cover 410 and the supply seal plate 406.

An o-ring groove 574 is formed in the supply seal plate 406 and is sized and arranged to receive the o-ring 576. The o-ring 576 achieves a seal between the supply seal plate 406 and the body 401.

An o-ring groove 578 is formed in the cylinder seal plate 408 and is sized and arranged to receive the o-ring 580. The o-ring 580 achieves a seal between the cylinder seal plate 408 and the body 401.

An o-ring groove 582 is formed around the bore 348 and is sized and arranged to receive the o-ring 584. The o-ring 584 forms a seal between the cylinder cover 412 and the cylinder seal plate 408.

An o-ring groove 586 is formed in the cylinder cover 412 around the bore 560 and is sized and arranged to receive the o-ring 588. The o-ring 588 achieves a seal between the cylinder cover 412 and the body 401.

The alternative embodiment of FIGS. 9–12 follows an operation sequence similar to the sequence described for the integrated valve 100, except the main valve 400 in the alternative embodiment does not have a latching feature like the main valve 102 in the integrated valve design 100. The valve 400 must be activated on or off by the spool valve 300 in the alternative design.

What is claimed is:

1. A spool valve connected to a single pilot valve and a main valve to open and close the main valve in response to fluid signals from the pilot valve, the pilot valve connected to a source of pilot fluid so the spool valve can selectively direct such pilot fluid to an open chamber to open the main valve or to a close chamber to close the main valve and the main valve connected to a source of pressurized supply fluid to selectively direct such supply fluid to a downstream apparatus, the spool valve and the main valve both vented to atmosphere, the spool valve comprising:

an elongate movable spool positioned in an axial bore, the spool moving from an extended position which opens the spool valve to a retracted position which closes the spool valve, to selectively direct the flow of the pilot fluid through the spool valve to the main valve, one end of the movable spool selectively exposed to pressurized supply fluid;

the elongate movable spool having at least three lands of different diameters to control movement of the spool from the extended position to the retracted position;

a spring chamber in selective fluid communication with pilot fluid;

a spring captured in the spring chamber urging the movable spool into the extended position;

a pilot fluid passageway to allow pilot fluid to flow from the pilot valve to the spool valve, an open passageway to allow pilot fluid to selectively flow to the spring chamber and selectively flow from the spool valve to the open chamber, a close passageway to allow pilot fluid to selectively flow from the spool valve to the close chamber, and a vent passageway to atmosphere;

when the spool valve is in the open position and the main valve is in the closed position, the pilot valve is actuated allowing pilot fluid to flow through the pilot fluid passageway, the spool valve, the open passageway to the open chamber causing the main valve to open, and the open passageway also allows pilot-fluid to flow into the spring chamber to keep the movable spool in the extended position;

after the pilot valve is closed the pilot fluid in the spool valve is vented to atmosphere and the movable spool shifts from the extended position to the retracted position in response to supply pressure while the main valve remains open;

actuation of the pilot valve a second time causes pilot fluid to flow through the pilot fluid passageway and the spool valve through the close passageway to the close chamber causing the main valve to close; and when the pilot valve is closed and pilot fluid in the spool valve is vented to atmosphere, the movable spool shifts from the retracted closed position to the extended open position in response to urging from the spring, while the main valve remains closed.

2. The apparatus of claim 1 further including another land wherein the diameter of the first land and the second land are the same and the diameter of the second land being greater than the diameter of the third land and the diameter of the third land being greater than the diameter of the fourth land, when the spool valve is in the open position and the main valve is in the closed position, and the pilot valve is actuated, pilot fluid acts on the first land so the spool stays in the extended position while the third land is exposed to pressurized supply fluid, after the pilot valve is closed and the pilot fluid is vented to atmosphere, the pressurized supply fluid acts on the third land to shift the spool to the retracted position;

actuation of the pilot valve a second time causes pilot fluid to act on the differential area between the second land and the third land to hold the spool in the retracted position while the pressurized supply fluid is vented to atmosphere; and when the pilot valve is closed and the pilot fluid is vented to atmosphere, the movable spool shifts to the extended position in response to urging from the spring.

3. A spool valve connected to a single pilot valve and a main valve to open and close the main valve in response to fluid signals from the pilot valve, the pilot valve connected to a source of pilot fluid so the spool valve can selectively direct such pilot fluid to an open chamber to open the main valve or to a close chamber to close the main valve and the main valve connected to a source of pressurized supply fluid to selectively direct such supply fluid to a downstream apparatus, the spool valve adapted to be inserted in a valve chamber in a body, the body defining a pilot inlet port to allow fluid communication between the pilot valve and the spool valve and a pilot vent port to vent pilot fluid to atmosphere, the body further defining a supply port connected to the pressurized supply fluid, a cylinder port connected to the downstream apparatus and a main vent port connected to atmosphere, the spool valve comprising:

a stationary piston having a longitudinal through bore;

an elongate hollow sleeve positioned in the longitudinal bore of the stationary piston, the sleeve having an axial bore;

an elongate movable spool positioned in the hollow sleeve, the spool moving from an extended position which opens the spool valve to a retracted position which closes the spool valve, to selectively direct the flow of the pilot fluid through the spool valve to the main valve, one end of the movable spool selectively exposed to pressurized supply fluid;

the elongate movable spool having three lands of different diameters to control movement of the spool from the extended position to the retracted position;

a spring housing defining a spring chamber in selective fluid communication with pilot fluid;

a spring captured in the spring chamber between the elongate movable spool and the spring housing, the spring urging the movable spool into the extended position;

the sleeve and the stationary piston defining a pilot fluid passageway, an open passageway, a close passageway, and a vent passageway, the pilot fluid passageway connected on one end to the pilot inlet port and on an other end to a spool valve inlet port in the sleeve, the open passageway connected on one end to the spool valve inlet port in the sleeve and on an other end to the spring chamber, the open passageway also in fluid communication with an open chamber, the close passageway connected on one end to the outlet bore in the sleeve and the other end in fluid communication with a close chamber and the vent passageway connected on one end to the outlet bore in the sleeve and on an other to the pilot vent port;

when the spool valve is in the open position and the main valve is in the closed position, the pilot valve is actuated allowing pilot fluid to flow through the pilot inlet port, the pilot fluid passageway, the open passageway to the open chamber causing the main valve to open, and the open passageway also allows pilot fluid to flow into the spring chamber to keep the movable spool in the extended position;

after the pilot valve is closed the pilot fluid is vented to atmosphere through the vent passageway, the movable spool shifts from the extended position to the retracted position in response to supply pressure while the main valve remains open;

actuation of the pilot valve a second time causes pilot fluid to flow from the pilot inlet port to the pilot fluid passageway, the inner passageway in the sleeve where the retracted spool directs the pilot fluid to the close passageway and the close chamber causing the main valve to close; and when the pilot valve is closed and pilot fluid is vented to atmosphere, the movable spool shifts from the retracted closed position to the extended open position in response to urging from the spring, while the main valve remains closed.

4. The apparatus of claim 3 further including another land wherein the diameter of the first land and the second land are the same and the diameter of the second land being greater than the diameter of the third land and the diameter of the third land being greater than the diameter of the fourth land, when the spool valve is in the open position and the main valve is in the closed position, and the pilot valve is actuated, pilot fluid acts on the first land so the spool stays in the extended position while the third land is exposed to pressurized supply fluid, after the pilot valve is closed and the pilot fluid is vented to atmosphere, the pressurized supply fluid acts on the third land to shift the spool to the retracted position;

actuation of the pilot valve a second time causes pilot fluid to act on the differential area between the second land and the third land to hold the spool in the retracted position while the pressurized supply fluid is vented to atmosphere; and when the pilot valve is closed and the pilot fluid is vented to atmosphere, the movable spool shifts to the extended position in response to urging from the spring.

5. An integrated spool valve and main valve, the integrated valve connected to a single pilot valve, the pilot valve connected to a source of pilot fluid so the spool valve can selectively direct such pilot fluid to open or to close the main valve and the main valve connected to a source of pressurized supply fluid to selectively direct such supply fluid to a downstream apparatus, the integrated spool valve and main valve comprising:

a body defining a valve chamber, a pilot inlet port to allow fluid communication between the pilot valve and the spool valve, a supply port connected to the pressurized supply fluid, a function port connected to the downstream apparatus and a main vent port connected to atmosphere;

a plug engaging the valve chamber, the plug defining a pilot vent port to vent pilot fluid to the atmosphere;

the spool valve comprising;

a stationary piston having a longitudinal through bore;

an elongate hollow sleeve positioned in the longitudinal bore of the stationary piston, the sleeve having an axial bore;

an elongate movable spool positioned in the axial bore of the sleeve, the spool moving from an extended position which opens the spool valve to a retracted position which closes the spool valve, to selectively direct the flow of the pilot fluid through the spool valve to an open chamber or a close chamber, one end of the movable spool selectively exposed to pressurized supply fluid;

the elongate movable spool having three lands of different diameters to control movement of the spool from the extended position to the retracted position;

a spring housing defining a spring chamber in selective fluid communication with pilot fluid;

a spool valve spring captured in the spring chamber between the elongate movable spool and the spring housing, the spring urging the movable spool into the extended position;

the sleeve and the stationary piston defining a pilot fluid passageway, an open passageway, a close passageway, and a vent passageway, the pilot fluid passageway connected on one end to the pilot inlet port and on an other end to a spool valve inlet port in the sleeve, the open passageway connected on one end to the a spool valve inlet port in the sleeve and on an other end to the spring chamber, the open passageway also in fluid communication with the open chamber, the close passageway connected on one end to the a spool valve inlet port in the sleeve and the other end in fluid communication with the close chamber and the vent passageway connected on one end to the a spool valve inlet port in the sleeve and on an other to the pilot vent port;

the main valve comprising;

a valve cage sized and arranged to be inserted in the valve chamber of the body, the valve cage defining a first seat positioned between the supply port and the function port and a second seat positioned between the function port and the vent port;

a seal assembly carried by a movable elongate piston, the piston moving from a closed position in which the seal assembly is engaged with the first seat and disengaged with the second seat, allowing fluid communication between the function port and the vent port, and containing pressurized supply fluid in the supply port, to an open position in which the seal assembly is disengaged with the first seat and engaged with the second seat allowing pressurized supply fluid to flow from the supply port through the function port to the downstream apparatus, and preventing pressurized supply fluid from flowing to the vent port, the elongate piston having a head and a toe;

a main spring urging the movable piston into the closed position, the spring positioned in the close chamber;

a latching chamber formed on an interior of the elongate movable piston, near the head, the latching chamber in fluid communication with pressurized supply fluid when the main valve is in the open position, the latching chamber having an area exposed to pressurized supply fluid that generates sufficient latching force to overcome the opposing forces to hold the piston in the open position until the pilot is actuated and pilot fluid enters the close chamber overcoming the latching force to close the main valve;

when the spool valve is in the open position and the main valve is in the closed position, the pilot valve is actuated allowing pilot fluid to flow through the pilot inlet port, the pilot fluid passageway, the open passageway to the open chamber causing the main valve to open allowing pressurized supply fluid to flow from the supply port through the function port to the downstream apparatus, and the open passageway also allows pilot fluid to flow into the spring chamber to keep the movable spool in the extended position;

after the pilot valve is closed the pilot fluid is vented to atmosphere through the vent passageway, the movable spool shifts from the extended position to the retracted position in response to supply pressure while the main valve remains open;

actuation of the pilot valve a second time causes pilot fluid to flow from the pilot inlet port to the pilot fluid passageway, the inner passageway in the sleeve where the retracted spool directs the pilot fluid to the close passageway and the close chamber causing the main valve to close; and when the pilot valve is closed and pilot fluid is vented to atmosphere, the movable spool shifts from the retracted closed position to the extended open position in response to urging from the spring, while the main valve remains closed.

6. The apparatus of claim 5 further including another land wherein the diameter of the first land and the second land are the same and the diameter of the second land being greater than the diameter of the third land and the diameter of the third land being greater than the diameter of the fourth land;

when the spool valve is in the open position and the main valve is in the closed position, and the pilot valve is actuated, pilot fluid acts on the first land so the spool stays in the extended position while the third land is exposed to pressurized supply fluid, after the pilot valve is closed and the pilot fluid is vented to atmosphere, the pressurized supply fluid acts on the third land to shift the spool to the retracted position;

actuation of the pilot valve a second time causes pilot fluid to act on the differential area between the second land and the third land to hold the spool in the retracted position while the pressurized supply fluid is vented to atmosphere; and when the pilot valve is closed and the pilot fluid is vented to atmosphere, the movable spool shifts to the extended position in response to urging from the spring.

7. A spool valve connected to a single pilot valve and a main valve to open and close the main valve in response to fluid signals from the pilot valve, the pilot valve connected to a source of pilot fluid so the spool valve can selectively direct such pilot fluid to an open chamber in the main valve to open the main valve or to a close chamber in the main valve to close the main valve and the main valve connected to a source of pressurized supply fluid to selectively direct such supply fluid to a downstream apparatus, the spool valve comprising:

a spool valve body defining an axial bore sized and arranged to receive an elongate movable spool, the spool moving from an extended position which opens the spool valve to a retracted position which closes the spool valve, to selectively direct the flow of the pilot fluid through the spool valve, one end of the movable spool selectively exposed to pressurized supply fluid;

the elongate movable spool having at least three lands of different diameters to control movement of the spool from the extended position to the retracted position;

a spring chamber in selective fluid communication with pilot fluid;

a spring captured in the spring chamber urging the movable spool into the extended position;

the spool valve body further defining a pilot fluid passageway to allow pilot fluid to flow from the pilot valve to the spool valve, an open passageway to allow pilot fluid to selectively flow to the spring chamber and selectively flow from the spool valve to the open chamber, a close passageway to allow pilot fluid to selectively flow from the spool valve to the close chamber, and a vent passageway to atmosphere;

when the spool valve is in the open position and the main valve is in the closed position, the pilot valve is actuated allowing pilot fluid to flow through the pilot fluid passageway, the spool valve, the open passageway to the open chamber causing the main valve to open, and the open passageway also allows pilot fluid to flow into the spring chamber to keep the movable spool in the extended position;

after the pilot valve is closed the pilot fluid is vented to atmosphere through the vent passageway, and the movable spool shifts from the extended position to the retracted position in response to supply pressure while the main valve remains open;

actuation of the pilot valve a second time causes pilot fluid to flow through the pilot fluid passageway, the spool valve to the close passageway and the close chamber causing the main valve to close; and when the pilot valve is closed and pilot fluid is vented to atmosphere, the movable spool shifts from the retracted closed position to the extended open position in response to urging from the spring, while the main valve remains closed.

8. The apparatus of claim 7 further including another land wherein the diameter of the first land and the second land are the same and the diameter of the second land being greater than the diameter of the third land and the diameter of the third land being greater than the diameter of the fourth land, when the spool valve is in the open position and the main valve is in the closed position, and the pilot valve is actuated, pilot fluid acts on the first land so the spool stays in the extended position while the third land is exposed to pressurized supply fluid, after the pilot valve is closed and the pilot fluid is vented to atmosphere, the pressurized supply fluid acts on the third land to shift the spool to the retracted position;

actuation of the pilot valve a second time causes pilot fluid to act on the differential area between the second land and the third land to hold the spool in the retracted position while the pressurized supply fluid is vented to atmosphere; and when the pilot valve is closed and the pilot fluid is vented to atmosphere, the movable spool shifts to the extended position in response to urging from the spring.

* * * * *

UNITED STATES PATENT AND TRADEMARK OFFICE
CERTIFICATE OF CORRECTION

PATENT NO. : 6,527,010 B1
DATED : March 4, 2003
INVENTOR(S) : Richard R. Watson

It is certified that error appears in the above-identified patent and that said Letters Patent is hereby corrected as shown below:

Column 4,
Line 7, after the word "port" delete "18" and insert -- 118 --.
Line 26, after the first instance of the word "the" delete "four third" and insert -- fourth --.

Column 14,
Line 37, after the word "allows" delete "pilot-fluid" and insert -- pilot fluid --.

Signed and Sealed this

Twenty-second Day of July, 2003

JAMES E. ROGAN
*Director of the United States Patent and Trademark Office*